US012506596B2

(12) United States Patent
Nachbaur et al.

(10) Patent No.: US 12,506,596 B2
(45) Date of Patent: Dec. 23, 2025

(54) USER AUTHENTICATION TECHNIQUES FOR NATIVE COMPUTING APPLICATIONS

(71) Applicant: OKTA, INC., San Francisco, CA (US)

(72) Inventors: Michael Alexander Nachbaur, Surrey (CA); Rajdeep Nanua, Toronto (CA); Rita Zerrizuela, San Francisco, CA (US)

(*) Notice: Subject to any disclaimer, the term of this patent is extended or adjusted under 35 U.S.C. 154(b) by 219 days.

(21) Appl. No.: 18/362,779

(22) Filed: Jul. 31, 2023

(65) Prior Publication Data

US 2025/0047473 A1 Feb. 6, 2025

(51) Int. Cl.
*H04L 9/08* (2006.01)
*H04L 9/30* (2006.01)

(52) U.S. Cl.
CPC .......... *H04L 9/0825* (2013.01); *H04L 9/0861* (2013.01); *H04L 9/30* (2013.01)

(58) Field of Classification Search
CPC ... H04L 9/0825; H04L 9/0822; H04L 9/0841; H04L 9/3247
USPC .......................................................... 713/171
See application file for complete search history.

(56) References Cited

U.S. PATENT DOCUMENTS

| | | | |
|---|---|---|---|
| 9,430,207 B1* | 8/2016 | Bandhole | G06F 8/38 |
| 2014/0006788 A1* | 1/2014 | Ignatchenko | H04L 9/3263 |
| | | | 713/175 |
| 2019/0089702 A1* | 3/2019 | Bhatt | H04L 9/0825 |
| 2020/0374284 A1* | 11/2020 | Suresh | H04L 63/0861 |
| 2023/0029053 A1* | 1/2023 | Manuel-Devadoss | |
| | | | H04L 9/0825 |

* cited by examiner

*Primary Examiner* — Moeen Khan
(74) *Attorney, Agent, or Firm* — Holland & Hart LLP

(57) ABSTRACT

A method for user authentication at a client device is described. The method includes obtaining a unique identifier of a user associated with the client device. The method further includes performing a first sequence of operations to register the unique identifier and the client device with a native computing application in accordance with a cryptographic authentication protocol. One or more operations of the first sequence may be performed using a platform-agnostic framework associated with the native computing application. The method further includes performing a second sequence of operations to authenticate the client device and the user of the client device in accordance with the cryptographic authentication protocol. One or more operations of the second sequence may be performed using the platform-agnostic framework. The method further includes accessing the native computing application via the client device based on performing the first sequence of operations and the second sequence of operations.

16 Claims, 9 Drawing Sheets

USER AUTHENTICATION TECHNIQUES FOR NATIVE COMPUTING APPLICATIONS

FIELD OF TECHNOLOGY

The present disclosure relates generally to identity management and user authentication, and more specifically to user authentication techniques for native computing applications.

BACKGROUND

WebAuthn is a web standard that supports user authentication of websites viewed within web browsers. WebAuthn uses public key cryptography to verify users without passwords. The WebAuthn protocol includes a client registration process and a client authentication process. During the client registration process, a client device registers a public key credential with a relying party. During the client authentication process, the relying party uses the previously registered public key credential to verify the identity of the client device. WebAuthn provides a secure, convenient mechanism for users of web applications to sign-in without passwords. However, many aspects of the WebAuthn protocol are performed by web browsers, which makes it difficult for software developers to leverage WebAuthn for native computing applications (such as non-browser-based mobile or desktop applications).

SUMMARY

A method for user authentication at a client device is described. The method may include: obtaining a unique identifier of a user associated with the client device; performing a first sequence of operations to register the unique identifier and the client device with a native computing application in accordance with a cryptographic authentication protocol, where one or more operations of the first sequence are performed using a platform-agnostic framework associated with the native computing application; performing a second sequence of operations to authenticate the client device and the user of the client device in accordance with the cryptographic authentication protocol, where one or more operations of the second sequence are performed using the platform-agnostic framework; and accessing the native computing application via the client device based on performing the first sequence of operations and the second sequence of operations.

An apparatus for user authentication at a client device is described. The apparatus may include one or more memories storing processor executable code, and one or more processors coupled with the one or more memories. The one or more processors may be individually or collectively operable to execute the code to cause the client device to: obtain a unique identifier of a user associated with the client device; perform a first sequence of operations to register the unique identifier and the client device with a native computing application in accordance with a cryptographic authentication protocol, where one or more operations of the first sequence are performed using a platform-agnostic framework associated with the native computing application; perform a second sequence of operations to authenticate the client device and the user of the client device in accordance with the cryptographic authentication protocol, where one or more operations of the second sequence are performed using the platform-agnostic framework; and access the native computing application via the client device based on performing the first sequence of operations and the second sequence of operations.

Another apparatus for user authentication at a client device is described. The apparatus may include: means for obtaining a unique identifier of a user associated with the client device; means for performing a first sequence of operations to register the unique identifier and the client device with a native computing application in accordance with a cryptographic authentication protocol, where one or more operations of the first sequence are performed using a platform-agnostic framework associated with the native computing application; means for performing a second sequence of operations to authenticate the client device and the user of the client device in accordance with the cryptographic authentication protocol, where one or more operations of the second sequence are performed using the platform-agnostic framework; and means for accessing the native computing application via the client device based on performing the first sequence of operations and the second sequence of operations.

A non-transitory computer-readable medium storing code for user authentication at a client device is described. The code may include instructions are executable by one or more processors to: obtain a unique identifier of a user associated with the client device; perform a first sequence of operations to register the unique identifier and the client device with a native computing application in accordance with a cryptographic authentication protocol, where one or more operations of the first sequence are performed using a platform-agnostic framework associated with the native computing application; perform a second sequence of operations to authenticate the client device and the user of the client device in accordance with the cryptographic authentication protocol, where one or more operations of the second sequence are performed using the platform-agnostic framework; and access the native computing application via the client device based on performing the first sequence of operations and the second sequence of operations.

In some examples of the methods, apparatuses, and non-transitory computer-readable media described herein, performing the first sequence of operations may include operations, features, means, or instructions for: receiving information associated with a data object and one or more cryptographic parameters supported by the native computing application; generating a private key and a public key in accordance with the one or more cryptographic parameters, where the private key and the public key may be provisioned exclusively for the native computing application; signing the data object using the private key generated by the client device; transmitting, to a server associated with the native computing application, the signed data object and the public key generated by the client device; and storing the private key in a secure module of the client device.

In some examples of the methods, apparatuses, and non-transitory computer-readable media described herein, the one or more cryptographic parameters associated with generating the private key and the public key may be configured using the platform-agnostic framework.

In some examples of the methods, apparatuses, and non-transitory computer-readable media described herein, one or more parameters associated with storing the private key in the secure module of the client device may be configured using the platform-agnostic framework.

In some examples of the methods, apparatuses, and non-transitory computer-readable media described herein, performing the second sequence of operations may include operations, features, means, or instructions for: receiving, via the native computing application, a data object provisioned by a first server associated with an identity management platform; retrieving a private key from a secure module of the client device based on verifying a credential provided by the user of the client device; signing the data object using the private key retrieved from the secure module of the client device; and transmitting the signed data object to a second server associated with the native computing application.

In some examples of the methods, apparatuses, and non-transitory computer-readable media described herein, the signed data object provided by the client device may be verified using the platform-agnostic framework.

In some examples of the methods, apparatuses, and non-transitory computer-readable media described herein, the platform-agnostic framework includes a software development kit (SDK) that is compatible with a set of multiple native computing environments.

In some examples of the methods, apparatuses, and non-transitory computer-readable media described herein, the platform-agnostic framework may be configured by an identity management platform, and the set of multiple native computing environments may be associated with the identity management platform.

In some examples of the methods, apparatuses, and non-transitory computer-readable media described herein, the SDK supports WebAuthn integration for non-browser-based native computing applications.

In some examples of the methods, apparatuses, and non-transitory computer-readable media described herein, the first sequence of operations and the second sequence of operations may be performed without accessing web browsers, web applications, or third-party authenticators.

In some examples of the methods, apparatuses, and non-transitory computer-readable media described herein, one or more key synchronization parameters of the cryptographic authentication protocol may be configured using the platform-agnostic framework.

DETAILED DESCRIPTION

Figure 1:
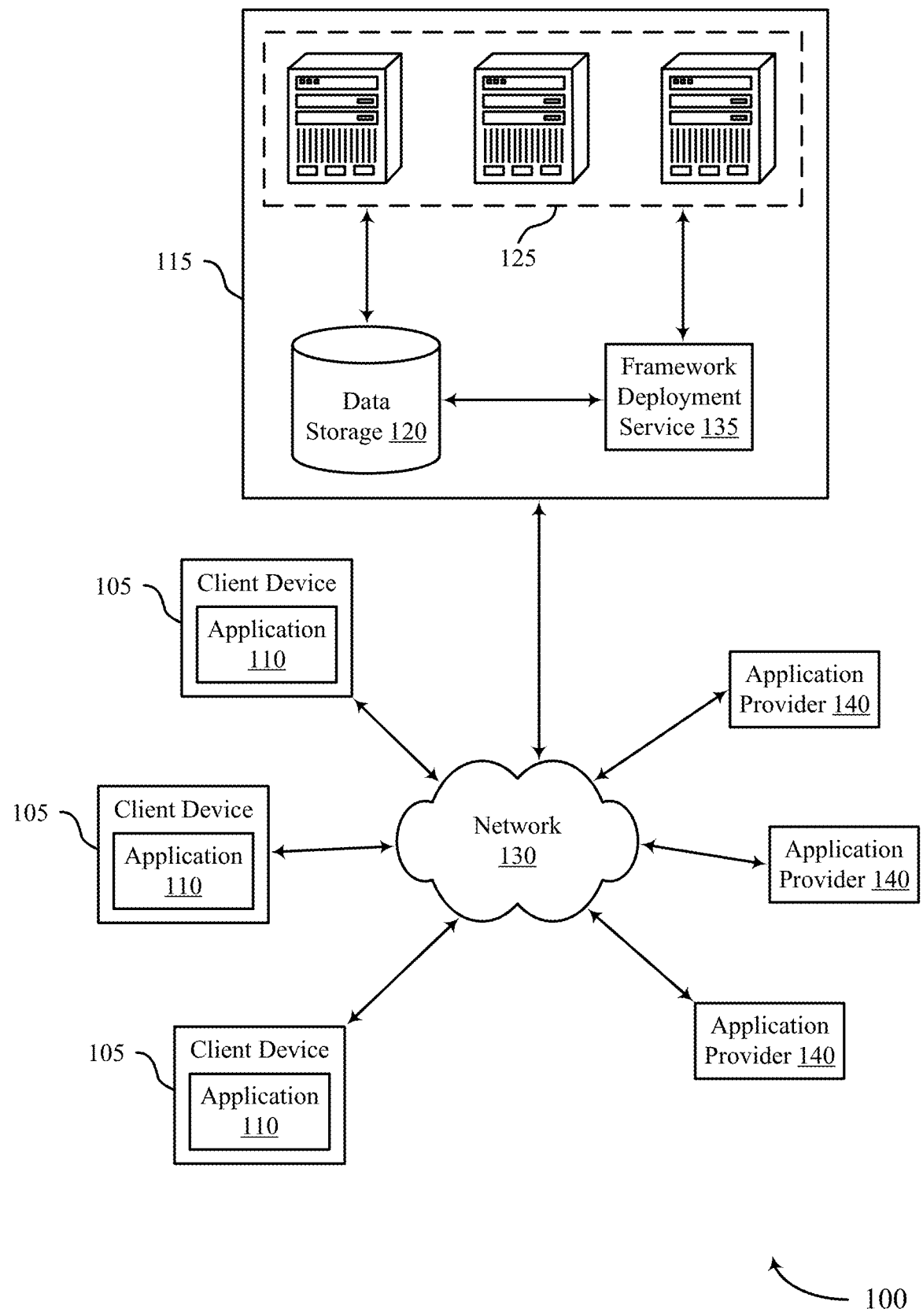
FIGS. 1, 2A, and 2B illustrate examples of systems that support user authentication techniques for native computing applications in accordance with aspects of the present disclosure.

Many applications use WebAuthn for user authentication purposes. WebAuthn is a browser-based application programming interface (API) that supports biometric user authentication for web browsers. WebAuthn uses public key cryptography to authenticate users without passwords. The WebAuthn protocol includes a client registration process and a client authentication process. During the client registration process, a client device registers a public key credential with a relying party server. During the client authentication process, the relying party server uses the previously registered public key credential to verify the identity of the client device. WebAuthn provides a secure, convenient mechanism for users of web applications to sign-in without passwords. However, many aspects of the WebAuthn protocol are performed by web browsers, which makes it difficult for application providers to leverage WebAuthn for native computing applications (such as mobile or desktop applications that operate without web browsers).

The techniques described herein generally provide for using a platform-agnostic framework to integrate WebAuthn with native computing applications. In accordance with one or more aspects of the present disclosure, a client device may obtain a unique identifier (such as a username or email address) of a user associated with the client device. The client device may perform a first sequence of operations to register the unique identifier and the client device with a native computing application in accordance with a cryptographic authentication protocol (such as WebAuthn). Thereafter, the client device may perform a second sequence of operations to authenticate the client device and the user of the client device in accordance with the cryptographic authentication protocol. To perform the first sequence, the second sequence, or both, the client device and/or an application provider of the native computing application may use a platform-agnostic framework (such as a standalone library) to communicate with a relying party server that supports WebAuthn.

In some implementations, the platform-agnostic framework may be provisioned by an identity management platform associated with the native computing application. For example, a developer of the native computing application may obtain (i.e., download, retrieve) the platform-agnostic framework from the identity management platform and use a native WebAuthn client within the platform-agnostic framework to communicate with the relying party server. In some implementations, the platform-agnostic framework may include a software development kit (SDK) that is compatible with various operating systems (OSs) and/or programming languages. The platform-agnostic framework may enable application providers to configure WebAuthn for native computing applications without relying on web-browsers or third-party authenticators, thereby providing greater security and improved user experience. Additionally, the platform-agnostic framework described herein may enable application providers to customize or otherwise configure various parameters of the WebAuthn protocol for their specific native computing applications.

Aspects of the disclosure are initially described in the context of systems, user interfaces, and process flows that support user authentication techniques for native computing applications. Aspects of the disclosure are further illustrated by and described with reference to apparatus diagrams, system diagrams, and flowcharts that relate to user authentication techniques for native computing applications.

FIG. 1 illustrates an example of a system 100 that supports user authentication techniques for native computing applications in accordance with various aspects of the present disclosure. The system 100 includes client devices 105, an identity management platform 115, and application providers 140. The identity management platform 115 may include data storage 120, a framework deployment service 135, and one or more servers 125. The identity management platform 115 may communicate with client devices 105 and/or application providers 140 via a network 130 (such as a public or private network). A client device 105 may communicate with an application provider 140 over the network 130.

The network 130 may implement (i.e., utilize) transfer control protocol and internet protocol (TCP/IP), such as the Internet, or may implement other network protocols. The network 130 represents a communication pathway between the identity management platform 115, the client devices 105, and the application providers 140. In one example, the network 130 may use standard wireless and/or wired communications technologies and protocols. In another example, entities on the network 130 may use custom and/or dedicated data communication technologies.

A client device 105 may be an example of a user device, such as a server 125, a smartphone, or a laptop. In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other company type (e.g., organization type). A client device 105 may be configured to execute one or more native computing applications 110, which are software applications 110 designed to run on an OS of the client device 105. A native computing application 110 may include instructions that, when executed by one or more processors, cause the client device 105 to communicate with an application provider 140 via the network 130. Unlike web applications 110, a native computing application 110 may operate without a web browser.

An application provider 140 may be an example of a server, a node, a computer cluster, or any other type of computing system, component, or environment that supports one or multiple applications 110. An application 110 may include a native computing application 110, a cloud-based application 110, a web-based application 110, a network-based application 110, an on-premises application 110, an enterprise application 110, a consumer application 110, or a custom-built internal application 110. An application provider 140 may be configured to manage user accounts for multiple applications 110. The application provider 140 may support an API that is usable by external systems (such as the identity management platform 115) to interact with their applications 110. For example, the identity management platform 115 can use a third-party API to log in to a user account of a native computing application 110. An application provider 140 may interact with one or multiple client devices 105 via the network 130. An application provider 140 may use the identity management platform 115 to store, manage, and process the data associated with client devices 105. In some cases, an application provider 140 may have an associated security or permission level. For example, users associated with an application provider 140 may have access to certain applications 110, data, and/or database information within the identity management platform 115 based on the associated security or permission level of the application provider 140, and may not have access to others.

The identity management platform 115 may be configured to manage user accounts of various application providers 140. For example, the identity management platform 115 may create user accounts for third-party applications 110, configure the accounts with usernames and passwords, and modify, deactivate, or delete the accounts as needed. In some examples, the identity management platform 115 may support single sign-on (SSO) by serving as an identity provider (IdP) for one or more service providers (SPs), such as application providers 140. For example, a user can authenticate by logging into the identity management platform 115 via a client device 105. The identity management platform 115 may provide the client device 105 with a single portal from which the user can access various third-party services and applications 110 without additional verification. For example, the user can interact with the portal to specify a particular application 110, and the client device 105 can notify the identity management platform 115 accordingly.

Accordingly, the identity management platform 115 may access the appropriate authentication information and use it to log into the user's account for the identified service or application 110. For example, in response to the user launching an SSO-integrated application 110 (such as a native computing application 110) via the client device 105, the identity management platform 115 may automatically provide the relevant authentication information to the corresponding application provider 140. In one example, the identity management platform 115 may provide the relevant authentication information by inserting the information into the appropriate form fields of the application's sign-on screen(s) and executing a "sign-in" command. In another example, the identity management platform 115 may provide SSO services by interacting with an application 110 via an API provided by an application provider 140.

The identity management platform 115 may provide secure user authentication and authorization for various application providers 140 and client devices 105. The identity management platform 115 may simplify the management of user identities and their access to different resources within an organization. When a user joins an organization, their information (e.g., name, email address, username) is entered into the identity management platform 115. As described above, the identity management platform 115 may support SSO, enabling users to access multiple applications 110 with a single set of credentials. Users can log in to the identity management platform 115 (e.g., via a client device 105) with their username and password, and access all their authorized applications 110 without having to enter their credentials again. The identity management platform 115 may also provide various authentication services, including username and password, multi-factor authentication (MFA), and social login. MFA adds an extra layer of security by prompting users to provide additional verification, such as a code from a mobile application 110 or a fingerprint scan. The identity management platform 115 may act as a central user directory, storing user profiles and data in a data storage 120. The identity management platform 115 may be capable of integrating with existing directories using Active Directory (AD) or Lightweight Directory Access Protocol (LDAP), ensuring a centralized source of user information.

The identity management platform 115 may be configured to or otherwise capable of integrating with a wide range of applications 110, such as native computing applications 110, cloud-based applications 110, and on-premise applications 110. The identity management platform 115 may support Security Assertion Markup Language (SAML) and OpenID Connect (OIDC), enabling secure communication between the identity management platform 115, client devices 105, and application providers 140. The identity management platform 115 may enable administrators to define policies and rules to control user access to resources. Administrators can set permissions based on factors like user roles, groups, and attributes. The identity management platform 115 can automate user lifecycle management tasks such as provisioning, deprovisioning, and user updates. When a user joins or leaves an organization, their access to applications 110 and resources can be automatically granted or revoked, reducing administrative overhead. Additionally, or alternatively, the identity management platform 115 may provide security features to protect user identities and data. For example, the identity management platform 115 may support encryption, threat detection, and monitoring capabilities to ensure the integrity and confidentiality of user information. The identity management platform 115 may also help organizations comply with various regulatory constraints.

In some examples, the identity management platform 115 may be implemented as a multi-tenant cloud system. For instance, the identity management platform 115 may serve multiple tenants (i.e., organizations or services) with a single instance of software. However, other types of systems may be implemented, including—but not limited to—client-server systems, mobile device systems, and mobile network systems. In some implementations, the identity management platform 115 may support customer identity cloud (CIC) and workforce identity cloud (WIC) solutions for application providers 140. The identity management platform 115 may receive data associated with client devices 105 from application providers 140 over the network 130, and may store/analyze the data. In some cases, the identity management platform 115 may receive data directly from a client device 105 and/or an application provider 140. In some examples, an application provider 140 may develop native computing applications 110 to run on a specific OS. The identity management platform 115 may include one or more servers 125. In some cases, the servers 125 may be integrated with or otherwise connected to the data storage 120.

The servers 125 may be used for data storage 120, management, and/or processing. The data storage 120 may communicate with other components of the identity management platform 115 via a network connection. The data storage 120 may leverage redundancy for security purposes. In some cases, data stored at the data storage 120 may be backed up by copies of the data at another data storage 120. In some cases, data processing may occur at any of the components of the identity management platform 115, or at a combination of these components. In some cases, servers 125 may perform the data processing.

The identity management platform 115 may be an example of a multi-tenant system. For example, the identity management platform 115 may store data and provide services, solutions, or any other functionality for multiple tenants concurrently. A tenant may refer to a group of users (e.g., an organization) who share access, privileges, or both. The identity management platform 115 may effectively separate data and processes for a first tenant from data and processes for other tenants using a system architecture, logic, or both that support secure multi-tenancy. In some examples, the identity management platform 115 may include or be an example of a multi-tenant database system that stores data for different tenants (such as application providers 140) in a single database or a single set of databases. To support multi-tenant security, the multi-tenant database system may prohibit (e.g., restrict) a first tenant from accessing, viewing, or interacting in any way with data associated with a different tenant. As such, data of the first tenant may be isolated (e.g., logically isolated) from data of a second tenant, and the tenant data for the first tenant may be inaccessible to the second tenant. The identity management platform 115 may additionally use encryption techniques to further protect tenant-specific data from unauthorized access (e.g., by another tenant).

The identity management platform 115 may support any configuration for providing multi-tenant functionality. For example, the identity management platform 115 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The identity management platform 115 may support scaling of tenants within the multi-tenant system, for example, using scale triggers, automatic scaling procedures, scaling requests, or any combination thereof. In some cases, the identity management platform 115 may implement one or more scaling rules to promote sharing of resources across tenants. For example, a tenant may have a threshold quantity of processing resources, memory resources, or both.

Some application providers 140 use WebAuthn as a biometrically backed authenticator. WebAuthn is a web standard developed by the fast identity online (FIDO) alliance. However, WebAuthn is designed for web applications, and many aspects of the WebAuthn protocol are performed by web browsers. As a result, many non-browser-based applications 110 (such as native computing applications 110) may be unable to leverage WebAuthn (or may be able to leverage WebAuthn in a relatively inefficient or relatively ineffective manner), and may instead rely on other, less-secure approaches. Aspects of the present disclosure generally relate to using a FIDO2 client that supports WebAuthn for native SDKs (as well as software applications) using native biometric authentication.

It should be appreciated by a person skilled in the art that one or more aspects of the disclosure may be implemented to solve additional or alternative problems (other than those described above). Furthermore, aspects of the disclosure may provide technical improvements relative to "conventional" systems or processes described herein. However, the description and appended drawings only include example technical improvements that result from implementing aspects of the disclosure and, accordingly, do not represent all of the technical improvements provided within the scope of the claims.

Figure 2A:
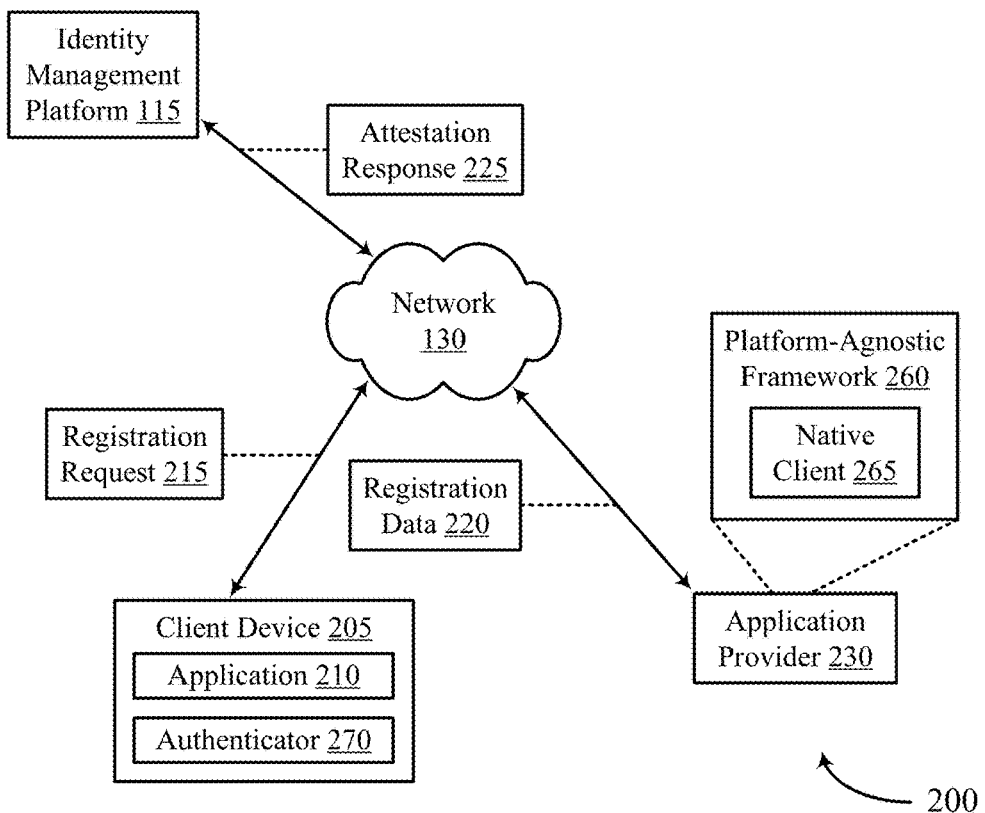
Figure 2B:
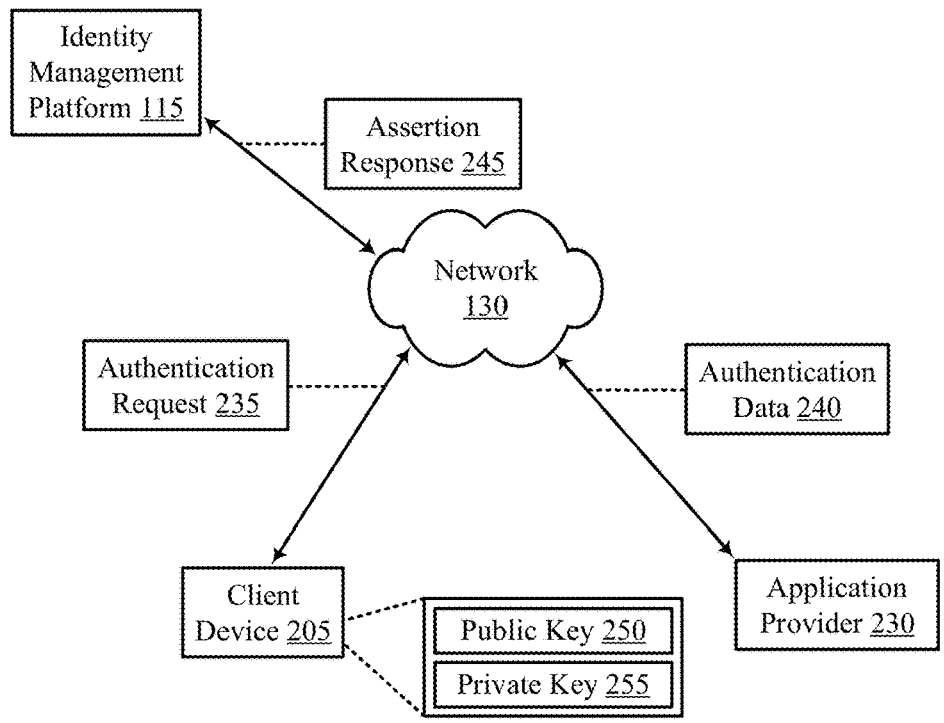

FIGS. 2A and 2B show examples of a system 200 and a system 201 that support user authentication techniques for native computing applications in accordance with aspects of the present disclosure. The systems 200 and 201 may implement various aspects of the system 100. For example, the systems 200 and 201 include a client device 205, which may be an example of a client device 105 described with reference to FIG. 1. The client device 205 may be capable of, configured to, or otherwise support a means for executing a native computing application 210, which may be an example of an application 110 described with reference to FIG. 1. The systems 200 and 201 also include an application provider 230, which may be an example of an application provider 140 described with reference to FIG. 1. Additionally, the systems 200 and 201 include a network 130 and an identity management platform 115, which may be examples of corresponding elements described with reference to FIG. 1.

As described herein, many browser-based applications and services use WebAuthn for user authentication. WebAuthn is an open-source standard developed by the World Wide Web Consortium (W3C) to provide authentication capabilities for web applications. WebAuthn is designed to improve online security and replace traditional password-based authentication methods with more secure, convenient options. The WebAuthn protocol includes a client registration process and a client authentication process.

The system 200 illustrates an example of a native WebAuthn client registration process, whereby the client device 205 (such as a laptop, desktop computer, or mobile phone) registers a new credential (i.e., public-private key pair) with the identity management platform 115 (e.g., a relying party) via the native computing application 210. The application provider 230 may use a platform-agnostic framework 260 provisioned by the framework deployment service 135 of the identity management platform 115 to configure one or more operations of the native WebAuthn client registration process. The platform-agnostic framework 260 may support one or more types of clouds, such as a type of cloud that may be used for managing identities associated with a workforce of an organization (e.g., a workforce identity cloud) or a type of cloud that may be used for managing identities associated with customers of an organization (e.g., a customer identity cloud), as well as one or more types of API integrations.

To begin the registration process, a user of the client device 205 may select an option to enable or set up WebAuthn-based authentication within the native computing application 210 (for example, by interacting with the user interface 300 shown and described with reference to FIG. 3A). In some implementations, the native computing application 210 may prompt the user to enter a unique identifier (such as a username or email address) before presenting the user with the option to enable WebAuthn for the native computing application 210.

The client device 205 may include the unique identifier and other registration information in a registration request 215 to the application provider 230. Upon receiving the registration request 215, the application provider 230 may collect the user information (e.g., username or email) for account association on the server-side. In turn, the application provider 230 may transmit registration data 220 back to the client device 205. The registration data 220 may include a challenge or attestation (such as a random value), a relying party ID, information associated with the user's account, etc. In some implementations, the application provider 230 may obtain the registration data 220 from a relying party server 125 of the identity management platform 115.

After receiving the registration data 220 from the application provider 230, the native computing application 210 may send a request to a local authenticator 270 (such as a platform authenticator or internal authenticator of the client device 205), instructing the local authenticator 270 to create a new credential for the native computing application 210. The local authenticator 270 of the client device 205 may then prompt the user to verify their identity (for example, using biometric information or a PIN).

In response to verifying the identity of the user, the local (i.e., on-device) authenticator 270 may generate a new public-private key pair, known as the "credential" for the user. This key pair includes a public key 250 and a private key 255 for the user's account. The local authenticator 270 may use the private key 255 (e.g., a P256 Private Key) to sign the challenge or attestation. In some implementations, the local authenticator 270 may generate the public key 250 and the private key 255 according to one or more key generation parameters configured by an administrator or developer of the native computing application 210 (for example, using the platform-agnostic framework 260).

Accordingly, the local authenticator 270 may return the signed attestation (such as a JavaScript Object Notation (JSON) object) and the public key 250 to the native computing application 210. In some implementations, the client device 205 may store the private key 255 within a secure enclave (such as a dedicated secure subsystem of the client device 205) in accordance with one or more key storage parameters configured by an administrator or developer of the native computing application 210 (for example, using the platform-agnostic framework 260).

In turn, the client device 205 may send the signed attestation and the public key 250, along with other details (e.g., credential ID, key generation parameters, relying party ID), to the application provider 230. Upon receiving this information, the application provider 230 may invoke (i.e., call) a native WebAuthn client 265 associated with the platform-agnostic framework 260 provisioned by the framework deployment service 135 of the identity management platform 115. In some implementations, the native WebAuthn client 265 may be embedded within one or more types of SDKs (e.g., a type of SDK for managing identities, a type of SDK for managing authentication) of the platform-agnostic framework 260.

The native WebAuthn client 265 may process the information provided by the client device 205 and return data associated with an attestation response 225 that is ingestible by the identity management platform 115. Accordingly, the application provider 230 may transmit the data associated with the attestation response 225 to a relying party server 125 of the identity management platform 115, which may verify the contents of the attestation response 225 and register the new credential with the user's account.

The system 201 illustrates an example of a native WebAuthn client authentication process, whereby the client device 205 uses an existing (i.e., pre-registered) credential to sign the user into the native computing application 210. The application provider 230 may use the platform-agnostic framework 260 provisioned by the framework deployment service 135 of the identity management platform 115 to configure one or more operations of the native WebAuthn client authentication process.

The client device 205 may initiate the WebAuthn client authentication process, for example, by transmitting an authentication request 235 to the application provider 230. The authentication request 235 may include a username or email address of the user, an identifier of the client device 205, etc. In some implementations, the client device 205 may transmit the authentication request 235 in response to the user selecting an option to sign into the native computing application 210 using WebAuthn.

In response to the authentication request 235, the application provider 230 may return authentication data 240 to the client device 205. The authentication data 240 may include a challenge or assertion (such as a data block, a random value, or a nonce), a list of previously registered credentials the client device 205 can use to authenticate the user, a relying party ID, etc. In some implementations, the application provider 230 may obtain some or all of the authentication data 240 from a relying party server 125 of the identity management platform 115.

Upon receiving the authentication data 240, the native computing application 210 may call the local authenticator 270 of the client device 205, which may identify the matching credential, verify the identity of the user (for example, using facial recognition or a fingerprint scan), and sign the challenge with the private key 255 of the matching credential. In some implementations, the local authenticator 270 may retrieve the private key 255 from a secure enclave (such as a dedicated secure subsystem of the client device 205) in accordance with one or more key storage parameters configured by an administrator or developer of the native computing application 210. Once signed, the local authenticator 270 may pass the challenge back to the native computing application 210.

Accordingly, the client device 205 may send the signed challenge (i.e., assertion), authenticator data, client data, the relying party ID, and other information to the application provider 230. Upon receiving this information from the client device 205, the application provider 230 may call or invoke the native WebAuthn client 265 to process the information provided by the client device 205. The native WebAuthn client 265 may return data associated with an assertion response 245 that is ingestible by a relying party server 125 of the identity management platform 115.

The application provider 230 may then transmit the data associated with the assertion response 245 to the relying party server 125 of the identity management platform 115, which may verify the contents of the assertion response 245 using the previously registered credential associated with the user's account. If the assertion response 245 is valid, the relying party server 125 of the identity management platform 115 may notify the application provider 230. Accordingly, the application provider 230 may grant the client device 205 access to the user's account within the native computing application 210.

In contrast to other WebAuthn implementations, the client registration and authentication processes shown and described with reference to FIGS. 2A and 2B may be performed without accessing any web browsers, web applications, or third-party authenticators, thereby providing a seamless, integrated sign-in experience for the user of the client device 205. Furthermore, the application provider 230 may use the platform-agnostic framework 260 provisioned by the framework deployment service 135 of the identity management platform 115 to configure various parameters (such as a key generation scheme, a key storage procedure, or a key synchronization policy) of the WebAuthn protocol, thereby enabling the application provider 230 to customize WebAuthn for the native computing application 210.

Figure 3A:
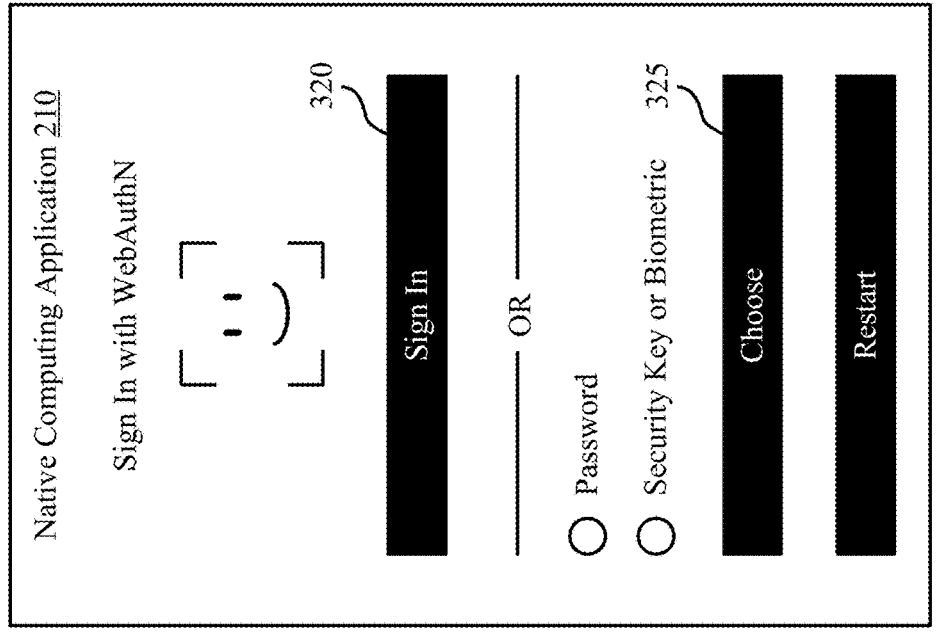
FIGS. 3A and 3B show examples of user interfaces that support user authentication techniques for native computing applications in accordance with aspects of the present disclosure.
Figure 3B:
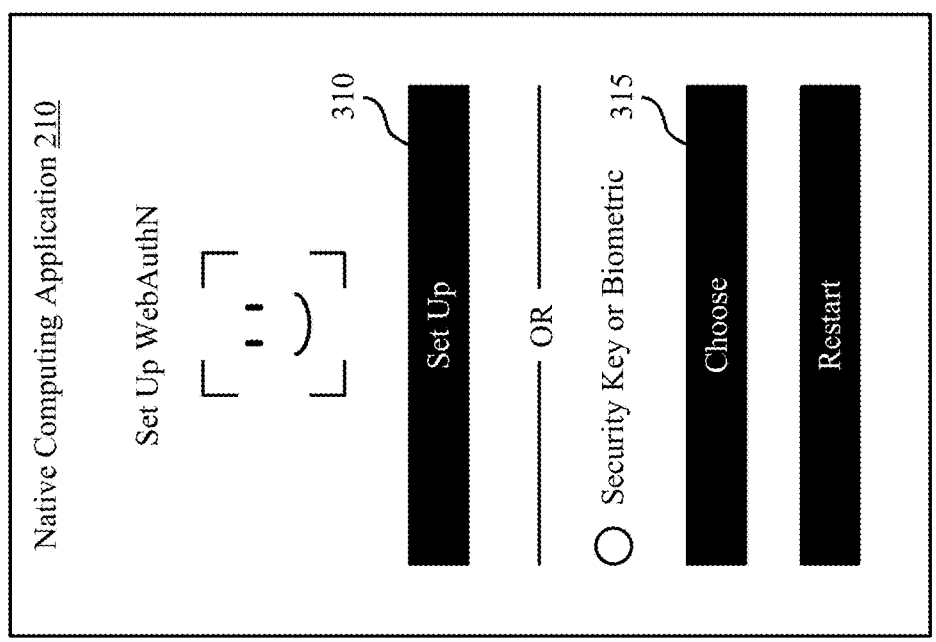

FIGS. 3A and 3B show examples of a user interface 300 and a user interface 301 that support user authentication techniques for native computing applications in accordance with aspects of the present disclosure. The user interfaces 300 and 301 may implement aspects of any of the systems shown and described with reference to FIGS. 1 through 2B. For example, the user interfaces 300 and 301 may be displayed or otherwise rendered on the client device 205, as described with reference to FIGS. 2A and 2B. The user interface 300 illustrates an example of a sign-up page that enables a user to register a new credential with a native computing application 210. The user interface 301 illustrates an example of a sign-in page that enables a user to log into the native computing application 210 using an existing credential.

As described herein, many applications and services use WebAuthn for user authentication purposes. WebAuthn is a browser-based API that supports biometric user authentication for web browsers. WebAuthn uses public key cryptography to authenticate users without passwords. The WebAuthn protocol includes a client registration process and a client authentication process. During the client registration process, a client device 205 registers a public key credential with a relying party server 125. During the client authentication process, the relying party server 125 uses the previously registered public key credential to verify the identity of the client device 205. WebAuthn provides a secure, convenient mechanism for users of web applications 110 to sign-in without passwords. However, many aspects of the WebAuthn protocol are performed by web browsers, which makes it difficult for application providers 140 to leverage WebAuthn for native computing applications 110 (such as mobile or desktop applications 110 that operate without web browsers).

The techniques described herein generally provide for using a platform-agnostic framework 260 to integrate WebAuthn with a native computing application 210. In accordance with one or more aspects of the present disclosure, the client device 205 may obtain a unique identifier (such as a username or email address) of a user associated with the client device 205. The client device 205 may perform a first sequence of operations to register the unique identifier and the client device 205 with a native computing application 210 in accordance with a cryptographic authentication protocol (such as WebAuthn). Thereafter, the client device 205 may perform a second sequence of operations to authenticate the client device 205 and the user of the client device 205 in accordance with the cryptographic authentication protocol. To perform the first sequence and the sequence, the client device 205 and/or an application provider 230 of the native computing application 210 may use a native WebAuthn client 265 of a platform-agnostic framework 260 (such as a standalone library) to communicate with a relying party server 125 associated with an identity management platform 115.

In some implementations, the platform-agnostic framework 260 may be provisioned by a framework deployment service 135 of the identity management platform 115. For example, a developer of the native computing application 210 may obtain (i.e., download, retrieve) the platform-agnostic framework 260 from the identity management platform 115 and use the native WebAuthn client 265 within the platform-agnostic framework 260 to communicate with the relying party server 125. In some implementations, the platform-agnostic framework 260 may include an SDK that is compatible with various OSs and/or programming languages. The platform-agnostic framework 260 may enable the application provider 230 to configure WebAuthn for the native computing application 210 without relying on web-browsers or third-party authenticators, thereby providing greater security and improved user experience. Additionally, the platform-agnostic framework 260 may enable the application provider 230 to customize or otherwise configure various parameters of the WebAuthn protocol for the native computing application 210.

A user of the client device 205 may initiate the first sequence of operations (i.e., the enrollment phase) by interacting or otherwise selecting (e.g., via the user interface 300) an option 310 to set up WebAuthn for the native computing application 210. The user interface 300 may also include an option 315 to use an alternate sign-up method (such as a security key or biometric information) to sign-up. In some implementations, the user of the client device 205 may be prompted to enter their username (such as an email address) and/or their password before the user interface 300 is presented to the user.

After selecting the option 310 to configure WebAuthn for the native computing application 210, a local authenticator 270 of the client device 205 may verify the user's identity (for example, using facial recognition software of the client device 205) and create a new credential for the user's account. To create the new credential, the local authenticator 270 of the client device 205 may use a locally generated P256 private key 255, which is stored within a secure enclave of the client device 205. In some implementations, the user may also be prompted to choose a MFA scheme (such as Google Authenticator, Okta Verify, or Phone) to complete the enrollment process.

The native computing application 210 may use the native WebAuthn client 265 of the platform-agnostic framework 260 provisioned by the framework deployment service 135 of the identity management platform 115 to process the WebAuthn enrollment/challenge data from the identity management platform 115 during the first sequence of operations. The native WebAuthn client 265 may use native code to implement the FIDO2/WebAuthn specification to communicate with the identity management platform 115. The WebAuthn functionality provided by the native WebAuthn client 265 may be configured as a standalone library that can be shared between different cloud environments of the identity management platform 115.

In a similar manner, the user of the client device 205 may initiate the second sequence of operations (i.e., the authentication phase) by interacting or otherwise selecting (e.g., via the user interface 301) an option 320 to sign into the native computing application 210 using WebAuthn. The user interface 301 may also include an option 325 to use an alternate sign-up method (such as a password, security key, or biometric information) to log into the native computing application 210. In some implementations, the user of the client device 205 may be prompted to enter their username (such as an email address) before the user interface 301 is presented to the user. In other implementations, the username may be locally cached and retrieved by the client device 205, such that the user interface 301 is automatically presented to the user when the native computing application 210 is started.

After selecting the option 320 to sign-in using WebAuthn, a local authenticator 270 of the client device 205 may verify the user's identity (for example, using facial recognition software of the client device 205) and retrieve a previously-registered credential for the user's account. In some implementations, the local authenticator 270 of the client device 205 may retrieve the user's credential (such as a locally generated P256 private key 255) from a secure enclave of the client device 205.

The private key 255 may be locally and securely stored on the client device 205. The client device 205 may perform the first and second sequence of operations without interacting with third party authenticators or widgets. The native computing application 210 may use optional biometrics to provide seamless authentication for users of the native computing application 210. In some implementations, the client device 205 may refrain from sharing the private key 255 and/or the public key 250 with other devices, thereby reducing the likelihood of the private key 255 being exposed or compromised.

Figure 4:
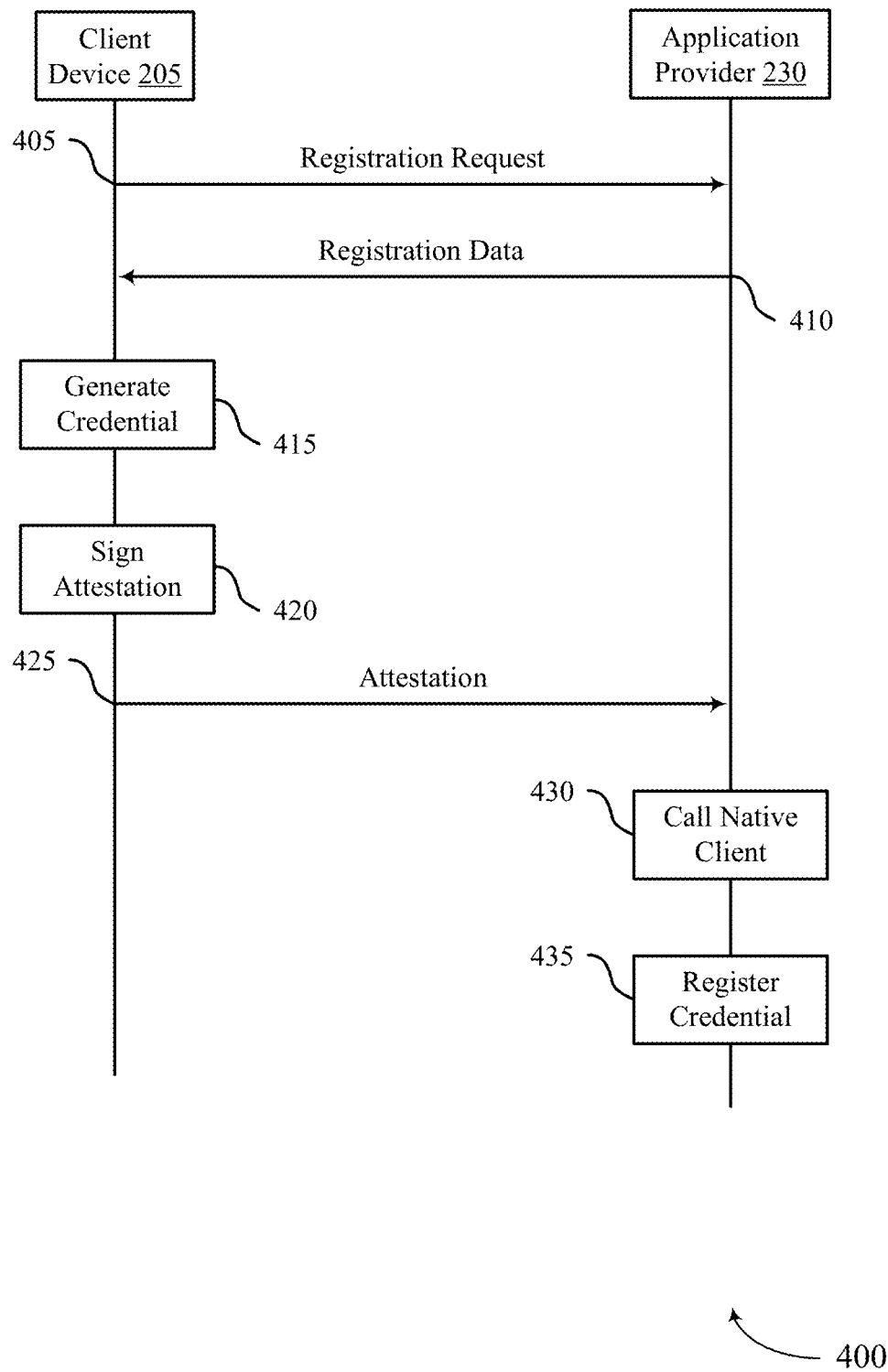
FIGS. 4 and 5 show examples of process flows that support user authentication techniques for native computing applications in accordance with aspects of the present disclosure.

FIG. 4 shows an example of a process flow 400 that supports user authentication techniques for native computing applications in accordance with aspects of the present disclosure. The process flow 400 may implement aspects of any of the systems or user interfaces shown and described with reference to FIGS. 1 through 3B. For example, the process flow 400 includes a client device 205 and an application provider 230, which may be examples of corresponding elements shown and described with reference to FIGS. 2A and 2B. In some implementations, a user of the client device 205 may interact with the native computing application 210 via the user interface 300 shown and described with reference to FIG. 3A. In the following description of the process flow 400, operations between the client device 205 and the application provider 230 may be added, omitted, or performed in a different order (with respect to the exemplary order shown).

The process flow 400 illustrates an example of a native WebAuthn client registration process, whereby the client device 205 (such as a laptop, desktop computer, or mobile phone) registers a new credential (i.e., public-private key pair) with the identity management platform 115 (e.g., a relying party) via the native computing application 210. The application provider 230 may use the platform-agnostic framework 260 provisioned by the framework deployment service 135 of the identity management platform 115 to configure one or more operations of the native WebAuthn client registration process.

To begin the native WebAuthn client registration process, a user of the client device 205 may select (for example, by interacting with the user interface 300) the option 310 to enable or set up WebAuthn-based authentication within the native computing application 210. In some implementations, the native computing application 210 may prompt the user to enter a unique identifier (such as a username or email address) before presenting the user with the option 310 to enable WebAuthn for the native computing application 210.

At 405, the client device 205 may include the unique identifier and other registration information in a registration request 215 to the application provider 230. Upon receiving the registration request 215, the application provider 230 may collect the user information (e.g., username or email) for account association on the server-side. At 410, the application provider 230 may transmit registration data 220 back to the client device 205. The registration data 220 may include a challenge or attestation (such as a random value), a relying party ID, information associated with the user's account, etc. In some implementations, the application provider 230 may obtain the registration data 220 from a relying party server 125 of the identity management platform 115.

At 415, the native computing application 210 may send a request to a local authenticator 270 (such as a platform authenticator or internal authenticator of the client device 205), instructing the local authenticator 270 to create a new credential for the native computing application 210. The local authenticator 270 of the client device 205 may then prompt the user to verify their identity (for example, using biometric information or a PIN).

In response to verifying the identity of the user, the local (i.e., on-device) authenticator 270 may generate a new public-private key pair, known as the "credential" for the user. This key pair includes a public key 250 and a private key 255 for the user's account. At 420, the local authenticator 270 may use the private key 255 (e.g., a P256 Private Key) to sign the challenge or attestation. In some implementations, the local authenticator 270 may generate the public key 250 and the private key 255 according to one or more key generation parameters configured by an administrator or developer of the native computing application 210 (for example, using the platform-agnostic framework 260).

Accordingly, the local authenticator 270 may return the signed attestation and the public key 250 to the native computing application 210. In some implementations, the client device 205 may store the private key 255 within a secure enclave (such as a dedicated secure subsystem of the client device 205) in accordance with one or more key storage parameters configured by an administrator or developer of the native computing application 210 (for example, using the platform-agnostic framework 260).

At 425, the client device 205 may send the signed attestation and the public key 250, along with other details (e.g., credential ID, key generation parameters, relying party ID), to the application provider 230. At 430, the application provider 230 may invoke (i.e., call) a native WebAuthn client 265 associated with the platform-agnostic framework 260 provisioned by the framework deployment service 135 of the identity management platform 115.

The native WebAuthn client 265 may process the information provided by the client device 205 and return data associated with an attestation response 225 that is ingestible by a relying party server 125 of the identity management platform 115. At 435, the application provider 230 may transmit the data associated with the attestation response 225 to the relying party server 125, which may verify the contents of the attestation response 225 and register the new credential with the user's account.

In contrast to other WebAuthn implementations, the client registration process shown and described with reference to FIG. 4 may be performed without accessing any web browsers, web applications, or third-party authenticators, thereby providing a seamless, integrated sign-in experience for the user of the client device 205. Furthermore, the application provider 230 may use the platform-agnostic framework 260 provisioned by the framework deployment service 135 of the identity management platform 115 to configure various parameters (such as a key generation scheme, a key storage procedure, or a key synchronization policy) of the WebAuthn protocol, thereby enabling the application provider 230 to customize WebAuthn for the native computing application 210.

Figure 5:
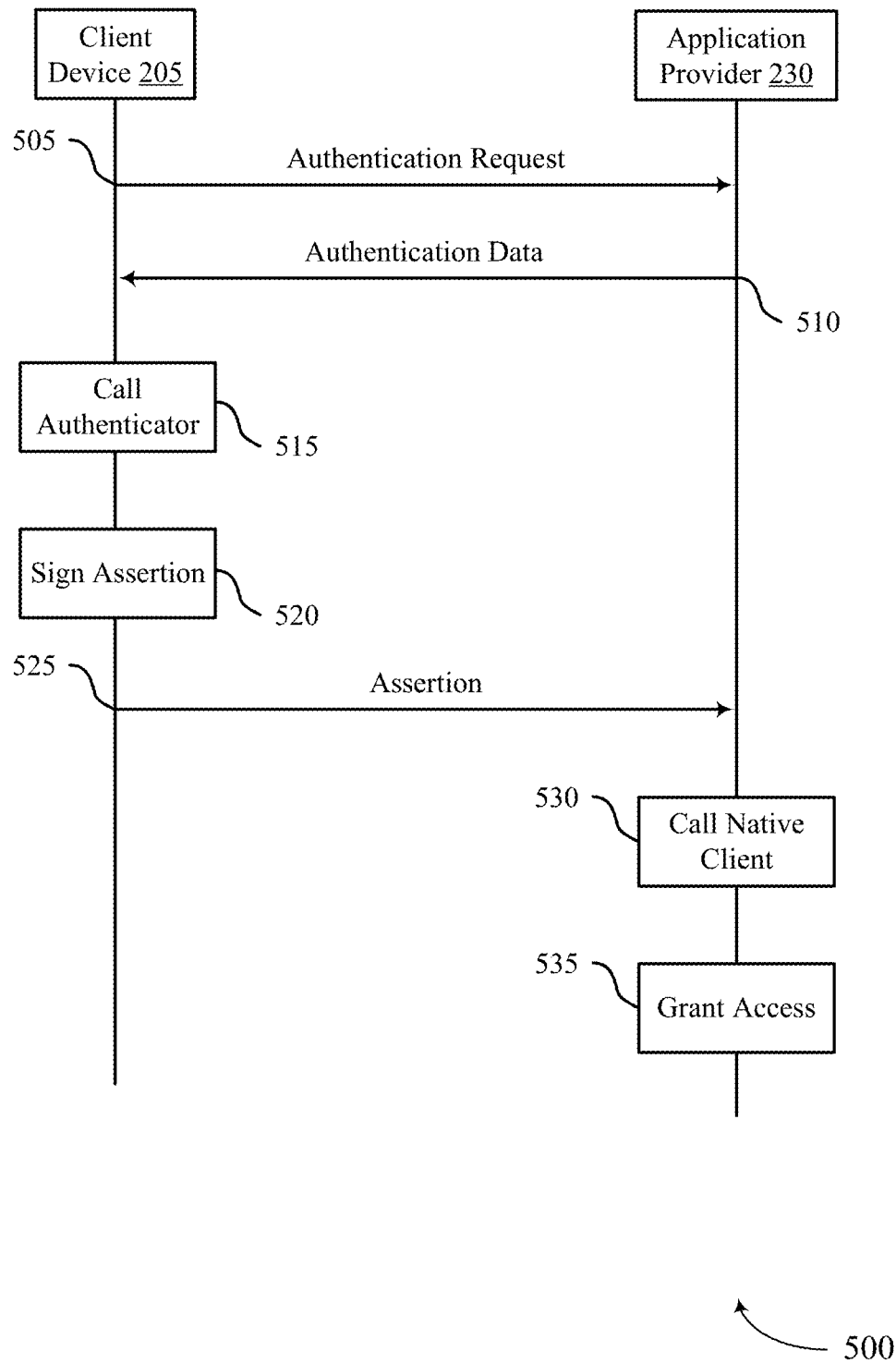

FIG. 5 shows an example of a process flow 500 that supports user authentication techniques for native computing applications in accordance with aspects of the present disclosure. The process flow 500 may implement aspects of any of the systems or user interfaces shown and described with reference to FIGS. 1 through 3B. For example, the process flow 500 includes a client device 205 and an application provider 230, which may be examples of corresponding elements shown and described with reference to FIGS. 2A and 2B. In some implementations, a user of the client device 205 may interact with the native computing application 210 via the user interface 301 shown and described with reference to FIG. 3B. In the following description of the process flow 500, operations between the client device 205 and the application provider 230 may be added, omitted, or performed in a different order (with respect to the exemplary order shown).

The process flow 500 illustrates an example of a native WebAuthn client authentication process, whereby the client device 205 uses an existing (i.e., pre-registered) credential to sign the user of the client device 205 into the native computing application 210. The application provider 230 may use the platform-agnostic framework 260 provisioned by the framework deployment service 135 of the identity management platform 115 to configure one or more operations of the native WebAuthn client authentication process.

At 505, the client device 205 may initiate the WebAuthn client authentication process by transmitting an authentication request 235 to the application provider 230. The authentication request 235 may include a username or email address of the user, an identifier of the client device 205, etc. In some implementations, the client device 205 may transmit the authentication request 235 in response to the user selecting (for example, via the user interface 300) the option 320 to sign into the native computing application 210 using WebAuthn.

At 510, the application provider 230 may return authentication data 240 to the client device 205. The authentication data 240 may include a challenge or assertion (such as a data block, a random value, or a nonce), a list of previously registered credentials the client device 205 can use to authenticate the user, a relying party ID, etc. In some implementations, the application provider 230 may obtain some or all of the authentication data 240 from a relying party server 125 of the identity management platform 115.

At 515, the native computing application 210 may call the local authenticator 270 of the client device 205. At 520, the local authenticator 270 may identify the matching credential, verify the identity of the user (for example, using facial recognition or a fingerprint scan), and sign the challenge with the private key 255 of the matching credential. In some implementations, the local authenticator 270 may retrieve the private key 255 from a secure enclave (such as a dedicated secure subsystem of the client device 205) in accordance with one or more key storage parameters configured by an administrator or developer of the native computing application 210 (for example, using the platform-agnostic framework 260). Once signed, the local authenticator 270 may pass the challenge back to the native computing application 210.

At 525, the client device 205 may send the signed challenge (i.e., assertion), authenticator data, client data, the relying party ID, and other information to the application provider 230. At 530, the application provider 230 may call or invoke the native WebAuthn client 265 to process the information provided by the client device 205. The native WebAuthn client 265 may return data associated with an assertion response 245 that is ingestible by a relying party server 125 of the identity management platform 115.

The application provider 230 may then transmit the data associated with the assertion response 245 to the relying party server 125 of the identity management platform 115, which may verify the contents of the assertion response 245 using the previously registered credential associated with the user's account. If the assertion response 245 is valid, the relying party server 125 of the identity management platform 115 may notify the application provider 230. At 535, the application provider 230 may grant the client device 205 access to the user's account within the native computing application 210.

In contrast to other WebAuthn implementations, the client authentication process shown and described with reference to FIG. 5 may be performed without accessing any web browsers, web applications, or third-party authenticators, thereby providing a seamless, integrated sign-in experience for the user of the client device 205. Furthermore, the application provider 230 may use the platform-agnostic framework 260 provisioned by the framework deployment service 135 of the identity management platform 115 to configure various parameters (such as a key generation scheme, a key storage procedure, or a key synchronization policy) of the WebAuthn protocol, thereby enabling the application provider 230 to customize the WebAuthn protocol for the native computing application 210.

Figure 6:
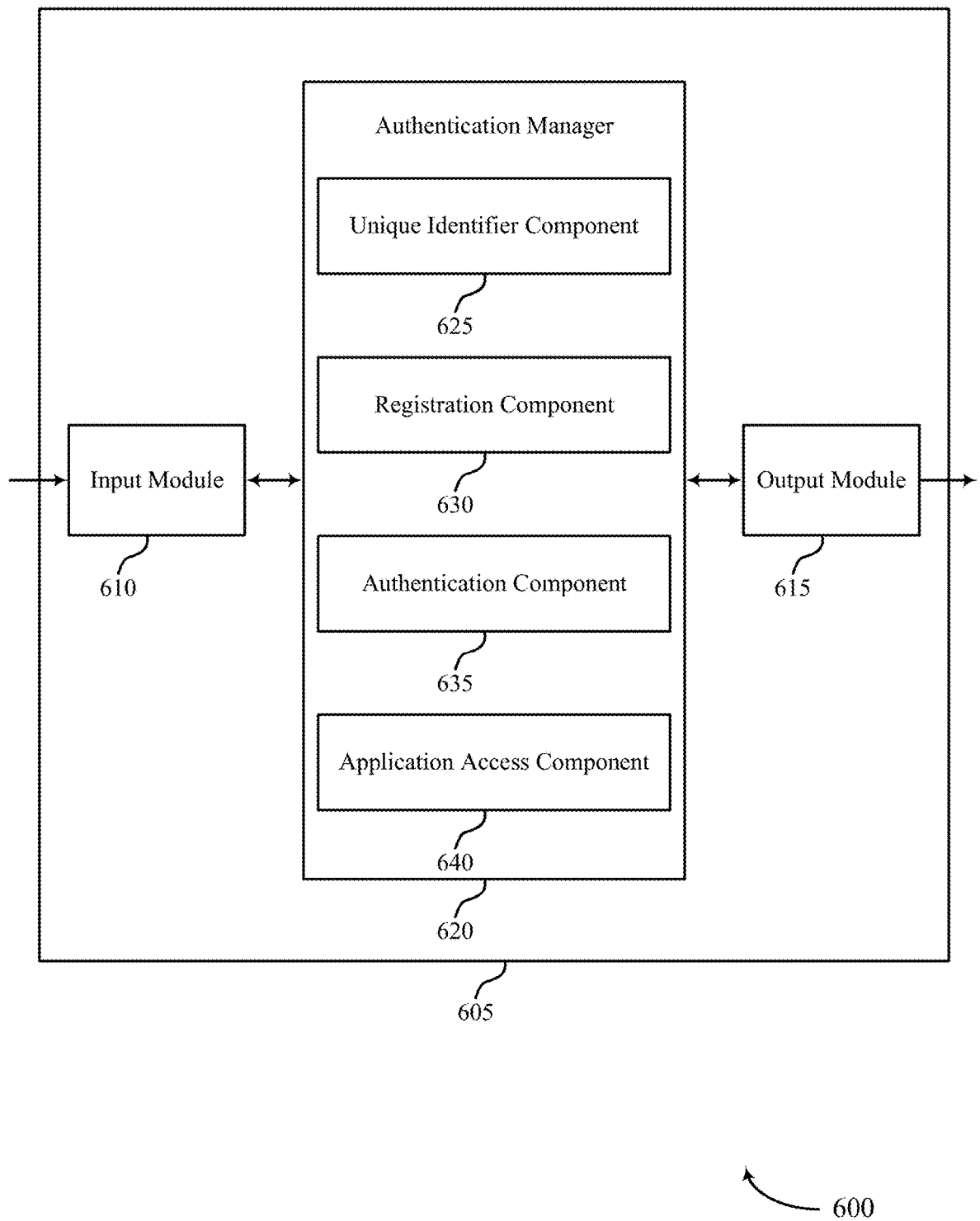
FIG. 6 shows a block diagram of an apparatus that supports user authentication techniques for native computing applications in accordance with aspects of the present disclosure.

FIG. 6 shows a block diagram 600 of a device 605 that supports user authentication techniques for native computing applications in accordance with aspects of the present disclosure. The device 605 may be an example of aspects of the client device 205, as shown and described with reference to FIGS. 2A and 2B. The device 605 may include an input module 610, an output module 615, and an authentication manager 620. The device 605, or one or more components of the device 605 (e.g., the input module 610, the output module 615, and the authentication manager 620), may include at least one processor, which may be coupled with at least one memory, to support the described techniques. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the authentication manager 620 to support user authentication techniques for native computing applications. In some cases, the input module 610 may be a component of an I/O controller 810 as described with reference to FIG. 8.

The output module 615 may manage output signals for the device 605. For example, the output module 615 may receive signals from other components of the device 605, such as the authentication manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the authentication manager 620 may include a unique identifier component 625, a registration component 630, an authentication component 635, an application access component 640, or any combination thereof. In some examples, the authentication manager 620, or various components thereof, may be configured to perform various operations (e.g., receiving, monitoring, transmitting) using or otherwise in cooperation with the input module 610, the output module 615, or both. For example, the authentication manager 620 may receive information from the input module 610, send information to the output module 615, or be integrated in combination with the input module 610, the output module 615, or both to receive information, transmit information, or perform various other operations as described herein.

The authentication manager 620 may support techniques for native WebAuthn integration, as described herein. The unique identifier component 625 may be configured to or otherwise capable of obtaining a unique identifier of a user associated with the device 605. The registration component 630 may be configured to or otherwise capable of performing a first sequence of operations to register the unique identifier and the device 605 with a native computing application 210 in accordance with a cryptographic authentication protocol, where one or more operations of the first sequence are performed using a platform-agnostic framework 260 associated with the native computing application 210. The authentication component 635 may be configured to or otherwise capable of performing a second sequence of operations to authenticate the device 605 and the user of the device 605 in accordance with the cryptographic authentication protocol, where one or more operations of the second sequence are performed using the platform-agnostic framework 260. The application access component 640 may be configured to or otherwise capable of accessing the native computing application 210 via the device 605 based on performing the first sequence of operations and the second sequence of operations.

Figure 7:
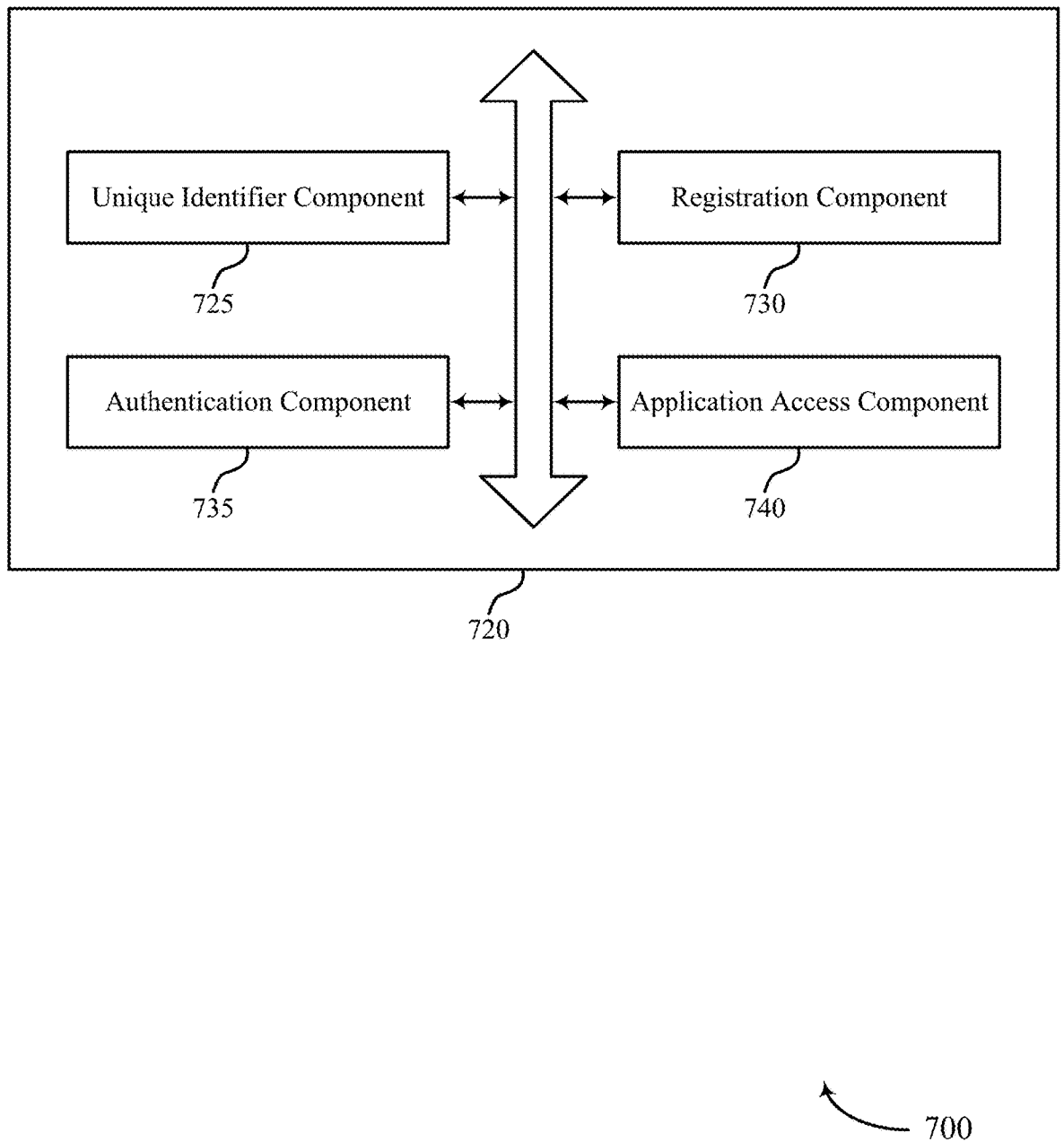
FIG. 7 shows a block diagram of an authentication manager that supports user authentication techniques for native computing applications in accordance with aspects of the present disclosure.

FIG. 7 shows a block diagram 700 of an authentication manager 720 that supports user authentication techniques for native computing applications in accordance with aspects of the present disclosure. The authentication manager 720 may be an example of aspects of an authentication manager or an authentication manager 620, or both, as described herein. The authentication manager 720, or various components thereof, may be an example of means for performing user authentication techniques for native computing applications, as described herein. For example, the authentication manager 720 may include a unique identifier component 725, a registration component 730, an authentication component 735, an application access component 740, or any combination thereof. Each of these components, or components of subcomponents thereof (e.g., one or more processors, one or more memories), may communicate, directly or indirectly, with one another (e.g., via one or more buses).

The authentication manager 720 may support user authentication in accordance with examples disclosed herein. The unique identifier component 725 may be configured to or otherwise capable of obtaining a unique identifier of a user associated with the device 605. The registration component 730 may be configured to or otherwise capable of performing a first sequence of operations to register the unique identifier and the device 605 with a native computing application 210 in accordance with a cryptographic authentication protocol, where one or more operations of the first sequence are performed using a platform-agnostic framework 260 associated with the native computing application 210. The authentication component 735 may be configured to or otherwise capable of performing a second sequence of operations to authenticate the device 605 and the user of the device 605 in accordance with the cryptographic authentication protocol, where one or more operations of the second sequence are performed using the platform-agnostic framework 260. The application access component 740 may be configured to or otherwise capable of accessing the native computing application 210 via the device 605 based on performing the first sequence of operations and the second sequence of operations.

In some examples, to support performing the first sequence of operations, the registration component 730 may be configured to or otherwise capable of receiving information associated with a data object and one or more cryptographic parameters supported by the native computing application 210. In some examples, to support performing the first sequence of operations, the registration component 730 may be configured to or otherwise capable of generating a private key 255 and a public key 250 in accordance with the one or more cryptographic parameters, where the private key 255 and the public key 250 are provisioned exclusively for the native computing application 210. In some examples, to support performing the first sequence of operations, the registration component 730 may be configured to or otherwise capable of signing the data object using the private key 255 generated by the device 605. In some examples, to support performing the first sequence of operations, the registration component 730 may be configured to or otherwise capable of transmitting, to a server 125 associated with the native computing application 210, the signed data object and the public key generated by the device 605. In some examples, to support performing the first sequence of operations, the registration component 730 may be configured to or otherwise capable of storing the private key 255 in a secure module of the device 605.

In some examples, the one or more cryptographic parameters associated with generating the private key 255 and the public key 250 are configured using the platform-agnostic framework 260. In some examples, one or more parameters associated with storing the private key 255 in the secure module of the device 605 are configured using the platform-agnostic framework 260.

In some examples, to support performing the second sequence of operations, the authentication component 735 may be configured to or otherwise capable of receiving, via the native computing application 210, a data object provisioned by a first server associated with an identity management platform 115. In some examples, to support performing the second sequence of operations, the authentication component 735 may be configured to or otherwise capable of retrieving a private key 255 from a secure module of the device 605 based on verifying a credential provided by the user of the device 605. In some examples, to support performing the second sequence of operations, the authentication component 735 may be configured to or otherwise capable of signing the data object using the private key 255 retrieved from the secure module of the device 605. In some examples, to support performing the second sequence of operations, the authentication component 735 may be configured to or otherwise capable of transmitting the signed data object to a second server 125 associated with the native computing application 210.

In some examples, the signed data object provided by the device 605 is verified using the platform-agnostic framework 260. In some examples, the platform-agnostic framework 260 includes an SDK that is compatible with a set of multiple native computing environments. In some examples, the platform-agnostic framework 260 is configured by an identity management platform 115 and the set of multiple native computing environments are associated with application providers 140 that use the identity management platform 115.

In some examples, the SDK supports WebAuthn integration for non-browser-based native computing applications. In some examples, the first sequence of operations and the second sequence of operations are performed without accessing web browsers, web applications, or third-party authenticators. In some examples, one or more key synchronization parameters of the cryptographic authentication protocol are configured using the platform-agnostic framework 260.

Figure 8:
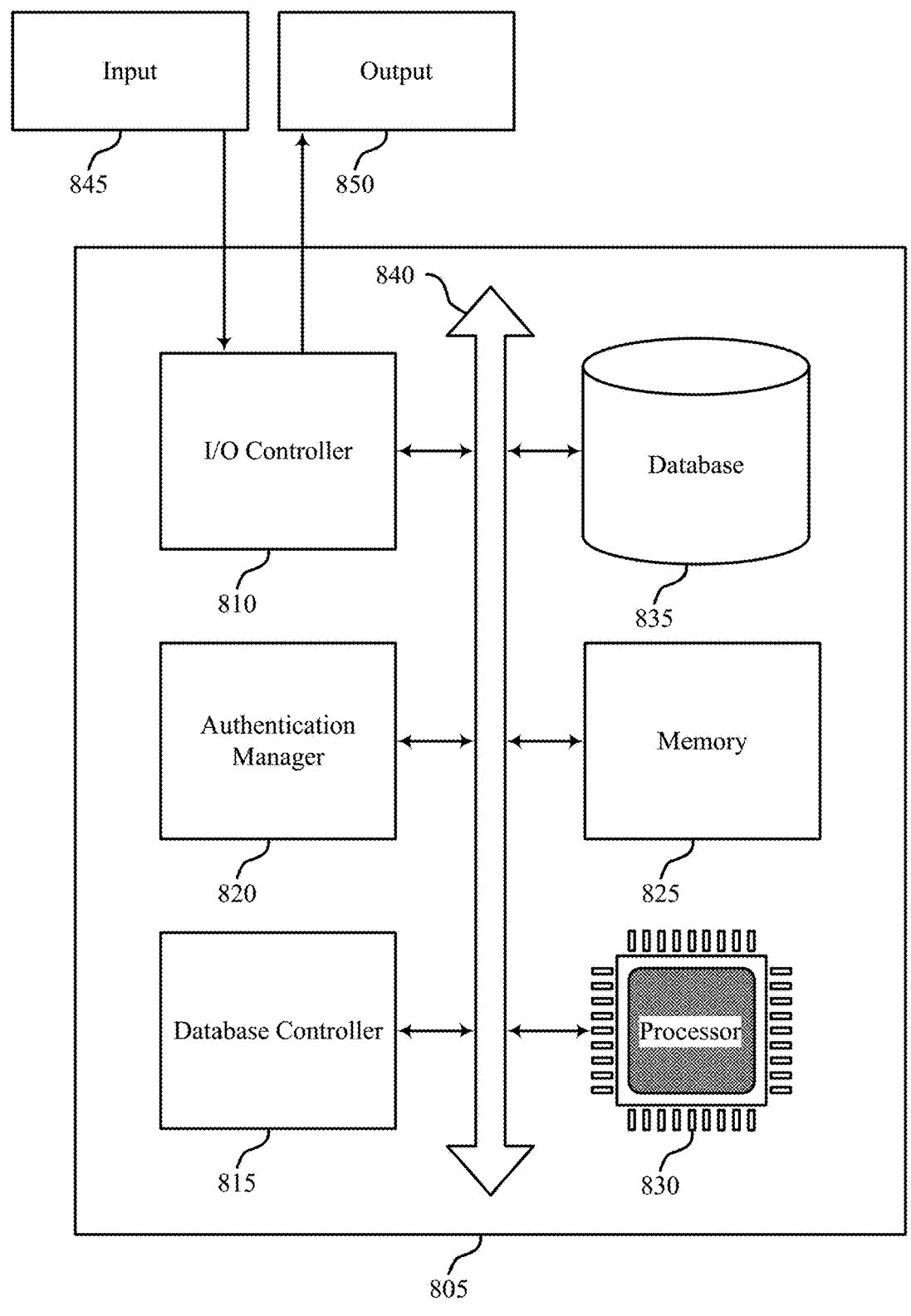
FIG. 8 shows a diagram of a system including a device that supports user authentication techniques for native computing applications in accordance with aspects of the present disclosure.

FIG. 8 shows a diagram of a system 800 including a device 805 that supports user authentication techniques for native computing applications in accordance with aspects of the present disclosure. The device 805 may be an example of (or include the components of) the device 605 and/or the client device 205, as described herein. The device 805 may include components for bi-directional data communications including components for transmitting and receiving communications, such as an authentication manager 820, an I/O controller 810, a database controller 815, at least one memory 825, at least one processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause at least one processor 830 to perform various functions described herein. In some cases, the memory 825 may contain, among other things, a basic I/O system (BIOS), which may control basic hardware or software operation such as the interaction with peripheral components or devices. The memory 825 may be an example of a single memory or multiple memories. For example, the device 805 may include one or more memories 825.

The processor 830 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in at least one memory 825 to perform various functions (e.g., functions or tasks supporting user authentication techniques for native computing applications). The processor 830 may be an example of a single processor or multiple processors. For example, the device 805 may include one or more processors 830.

The authentication manager 820 may support user authentication in accordance with examples as disclosed herein. For example, the authentication manager 820 may be configured to or otherwise capable of obtaining a unique identifier of a user associated with the device 805. The authentication manager 820 may be configured to or otherwise capable of performing a first sequence of operations to register the unique identifier and the device 805 with a native computing application 210 in accordance with a cryptographic authentication protocol, where one or more operations of the first sequence are performed using a platform-agnostic framework 260 associated with the native computing application 210. The authentication manager 820 may be configured to or otherwise capable of performing a second sequence of operations to authenticate the device 805 and the user of the client device in accordance with the cryptographic authentication protocol, where one or more operations of the second sequence are performed using the platform-agnostic framework 260. The authentication manager 820 may be configured to or otherwise capable of accessing the native computing application 210 via the device 805 based on performing the first sequence of operations and the second sequence of operations.

Figure 9:
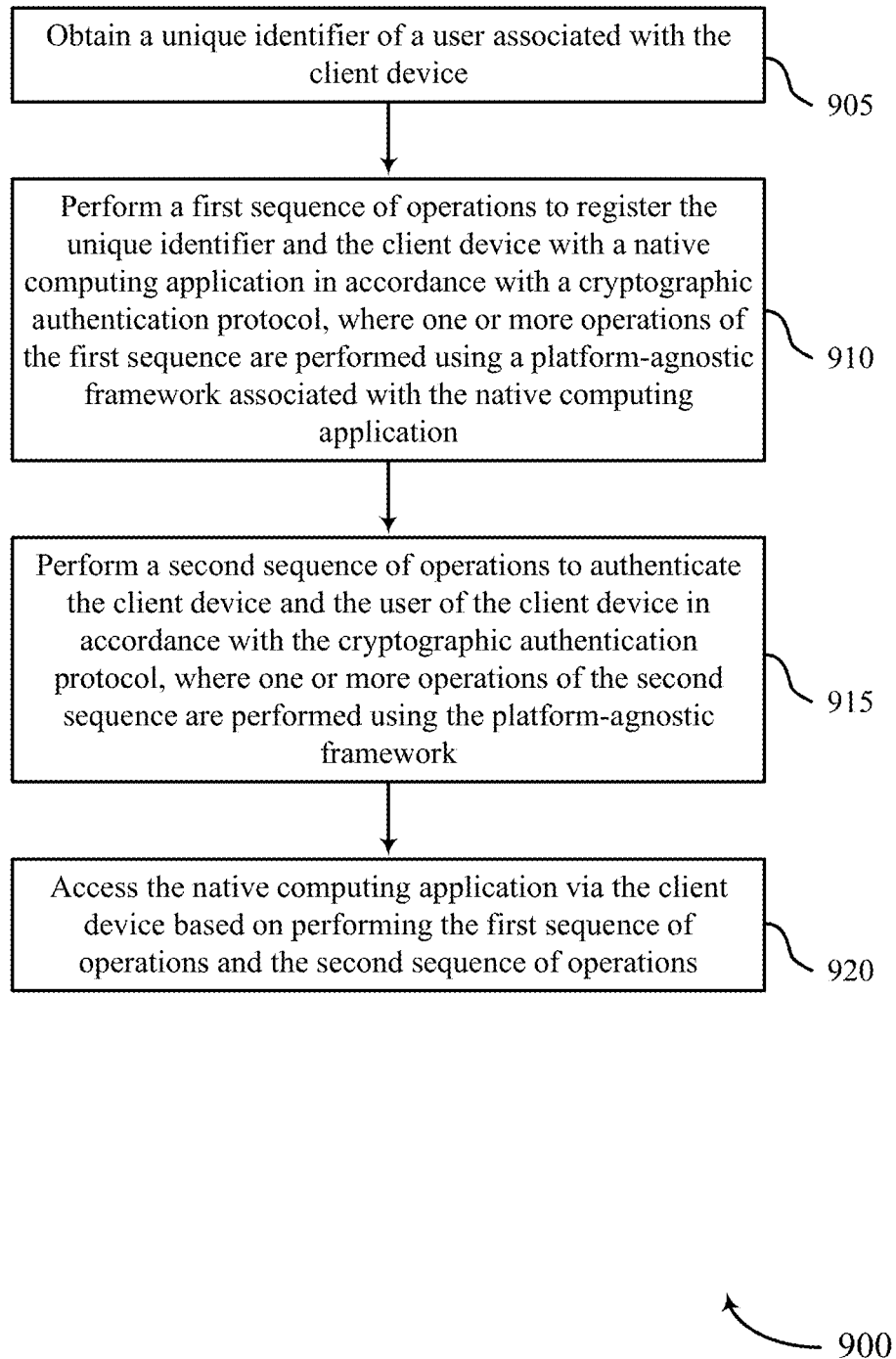
FIG. 9 shows a flowchart illustrating methods that support user authentication techniques for native computing applications in accordance with aspects of the present disclosure.

FIG. 9 shows a flowchart illustrating a method 900 that supports user authentication techniques for native computing applications in accordance with aspects of the present disclosure. The operations of the method 900 may be implemented by the client device 205, as shown and described with reference to FIGS. 2A and 2B. In some examples, the client device 205 may execute a set of instructions to control the functional elements of the client device 205 to perform the described functions. Additionally, or alternatively, the client device 205 may perform aspects of the described functions using special-purpose hardware.

At 905, the client device 205 may obtain a unique identifier of a user associated with the client device 205. In some examples, aspects of the operations of 905 may be performed by a unique identifier component 725, as described with reference to FIG. 7.

At 910, the client device 205 may perform a first sequence of operations to register the unique identifier and the client device 205 with a native computing application 210 in accordance with a cryptographic authentication protocol, where one or more operations of the first sequence are performed using a platform-agnostic framework 260 associated with the native computing application 210. In some examples, aspects of the operations of 910 may be performed by a registration component 730, as described with reference to FIG. 7.

At 915, the client device 205 may perform a second sequence of operations to authenticate the client device 205 and the user of the client device 205 in accordance with the cryptographic authentication protocol, where one or more operations of the second sequence are performed using the platform-agnostic framework 260. In some examples, aspects of the operations of 915 may be performed by an authentication component 735, as described with reference to FIG. 7.

At 920, the client device 205 may access the native computing application 210 via the client device 205 based on performing the first sequence of operations and the second sequence of operations. In some examples, aspects of the operations of 920 may be performed by an application access component 740 as described with reference to FIG. 7.

The following provides an overview of aspects of the present disclosure:

Aspect 1: A method for user authentication at a client device, comprising: obtaining a unique identifier of a user associated with the client device; performing a first sequence of operations to register the unique identifier and the client device with a native computing application in accordance with a cryptographic authentication protocol, wherein one or more operations of the first sequence are performed using a platform-agnostic framework associated with the native computing application; performing a second sequence of operations to authenticate the client device and the user of the client device in accordance with the cryptographic authentication protocol, wherein one or more operations of the second sequence are performed using the platform-agnostic framework; and accessing the native computing application via the client device based at least in part on performing the first sequence of operations and the second sequence of operations.

Aspect 2: The method of aspect 1, wherein performing the first sequence of operations comprises: receiving information associated with a data object and one or more cryptographic parameters supported by the native computing application; generating a private key and a public key in accordance with the one or more cryptographic parameters, wherein the private key and the public key are provisioned exclusively for the native computing application; signing the data object using the private key generated by the client device; transmitting, to a server associated with the native computing application, the signed data object and the public key generated by the client device; and storing the private key in a secure module of the client device.

Aspect 3: The method of aspect 2, wherein the one or more cryptographic parameters associated with generating the private key and the public key are configured using the platform-agnostic framework.

Aspect 4: The method of any of aspects 2 through 3, wherein one or more parameters associated with storing the private key in the secure module of the client device are configured using the platform-agnostic framework.

Aspect 5: The method of any of aspects 1 through 4, wherein performing the second sequence of operations comprises: receiving, via the native computing application, a data object provisioned by a first server associated with an identity management platform; retrieving a private key from a secure module of the client device based at least in part on verifying a credential provided by the user of the client device; signing the data object using the private key retrieved from the secure module of the client device; and transmitting the signed data object to a second server associated with the native computing application.

Aspect 6: The method of aspect 5, wherein the signed data object provided by the client device is verified using the platform-agnostic framework.

Aspect 7: The method of any of aspects 1 through 6, wherein the platform-agnostic framework comprises an SDK that is compatible with a plurality of native computing environments.

Aspect 8: The method of aspect 7, wherein the platform-agnostic framework is configured by an identity management platform and the plurality of native computing environments are associated with application providers that use the identity management platform.

Aspect 9: The method of any of aspects 7 through 8, wherein the SDK supports WebAuthn integration for non-browser-based native computing applications.

Aspect 10: The method of any of aspects 1 through 9, wherein the first sequence of operations and the second sequence of operations are performed without accessing web browsers, web applications, or third-party authenticators.

Aspect 11: The method of any of aspects 1 through 10, wherein one or more key synchronization parameters of the cryptographic authentication protocol are configured using the platform-agnostic framework.

Aspect 12: An apparatus, comprising one or more memories storing processor-executable code, and one or more processors coupled with the one or more memories and individually or collectively operable to execute the code to cause the apparatus to perform a method of any of aspects 1 through 11.

Aspect 13: An apparatus, comprising at least one means for performing a method of any of aspects 1 through 11.

Aspect 14: A non-transitory computer-readable medium storing code, the code comprising instructions executable by one or more processors to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for user authentication at a client device, comprising:
   obtaining a unique identifier of a user associated with the client device;
   performing a first sequence of operations to register the unique identifier and the client device with a native computing application in accordance with a cryptographic authentication protocol, wherein one or more operations of the first sequence are performed using a platform-agnostic framework associated with the native computing application, wherein one or more cryptographic parameters of the cryptographic authentication protocol are configured using the platform-agnostic framework, and wherein performing the first sequence of operations comprises:
      receiving information associated with a data object and the one or more cryptographic parameters, wherein the one or more cryptographic parameters are supported by the native computing application;
      generating a private key and a public key in accordance with the one or more cryptographic parameters, wherein the private key and the public key are provisioned exclusively for the native computing application;
      signing the data object using the private key generated by the client device;
      transmitting, to a server associated with the native computing application, the signed data object and the public key generated by the client device; and
      storing the private key in a secure module of the client device;
   performing a second sequence of operations to authenticate the client device and the user of the client device in accordance with the cryptographic authentication protocol that includes the one or more cryptographic parameters, wherein one or more operations of the second sequence are performed using the platform-agnostic framework; and
   accessing the native computing application via the client device based at least in part on performing the first sequence of operations and the second sequence of operations.

2. The method of claim 1, wherein the one or more cryptographic parameters comprise one or more parameters associated with storing the private key in the secure module of the client device.

3. The method of claim 1, wherein performing the second sequence of operations comprises:
   receiving, via the native computing application, the data object provisioned by a first server associated with an identity management platform;
   retrieving the private key from the secure module of the client device based at least in part on verifying a credential provided by the user of the client device;
   signing the data object using the private key retrieved from the secure module of the client device; and
   transmitting the signed data object to a second server associated with the native computing application.

4. The method of claim 3, wherein the signed data object provided by the client device is verified using the platform-agnostic framework.

5. The method of claim 1, wherein the platform-agnostic framework comprises a software development kit (SDK) that is compatible with a plurality of native computing environments.

6. The method of claim 5, wherein the platform-agnostic framework is configured by an identity management platform and the plurality of native computing environments are associated with application providers that use the identity management platform.

7. The method of claim 5, wherein the SDK supports WebAuthn integration for non-browser-based native computing applications.

8. The method of claim 1, wherein the first sequence of operations and the second sequence of operations are performed without accessing web browsers, web applications, or third-party authenticators.

9. The method of claim 1, wherein the one or more cryptographic parameters comprise one or more key synchronization parameters of the cryptographic authentication protocol.

10. An apparatus for user authentication at a client device, comprising:
    one or more memories storing processor-executable code; and
    one or more processors coupled with the one or more memories and individually or collectively operable to execute the code to cause the client device to:
       obtain a unique identifier of a user associated with the client device;
       perform a first sequence of operations to register the unique identifier and the client device with a native computing application in accordance with a cryptographic authentication protocol, wherein one or more operations of the first sequence are performed using a platform-agnostic framework associated with the native computing application, wherein one or more cryptographic parameters of the cryptographic authentication protocol are configured using the platform-agnostic framework, and wherein performing the first sequence of operations comprises:
          receive information associated with a data object and the one or more cryptographic parameters, wherein the one or more cryptographic parameters are supported by the native computing application;
          generate a private key and a public key in accordance with the one or more cryptographic parameters, wherein the private key and the public key are provisioned exclusively for the native computing application;
          sign the data object using the private key generated by the client device;

transmit, to a server associated with the native computing application, the signed data object and the public key generated by the client device; and store the private key in a secure module of the client device;

perform a second sequence of operations to authenticate the client device and the user of the client device in accordance with the cryptographic authentication protocol that includes the one or more cryptographic parameters, wherein one or more operations of the second sequence are performed using the platform-agnostic framework; and access the native computing application via the client device based at least in part on performing the first sequence of operations and the second sequence of operations.

11. The apparatus of claim 10, wherein the one or more cryptographic parameters comprise one or more parameters associated with storing the private key in the secure module of the client device.

12. The apparatus of claim 10, wherein, to perform the second sequence of operations, the one or more processors are individually or collectively operable to execute the code to cause the client device to:

receive, via the native computing application, the data object provisioned by a first server associated with an identity management platform;

retrieve the private key from the secure module of the client device based at least in part on verifying a credential provided by the user of the client device;

sign the data object using the private key retrieved from the secure module of the client device; and transmit the signed data object to a second server associated with the native computing application.

13. The apparatus of claim 12, wherein the signed data object provided by the client device is verified using the platform-agnostic framework.

14. The apparatus of claim 10, wherein the platform-agnostic framework comprises a software development kit (SDK) that is compatible with a plurality of native computing environments.

15. The apparatus of claim 14, wherein the platform-agnostic framework is configured by an identity management platform and the plurality of native computing environments are associated with application providers that use the identity management platform.

16. A non-transitory computer-readable medium storing code for user authentication at a client device, the code comprising instructions executable by one or more processors to:

obtain a unique identifier of a user associated with the client device;

perform a first sequence of operations to register the unique identifier and the client device with a native computing application in accordance with a cryptographic authentication protocol, wherein one or more operations of the first sequence are performed using a platform-agnostic framework associated with the native computing application, wherein one or more cryptographic parameters of the cryptographic authentication protocol are configured using the platform-agnostic framework, and wherein performing the first sequence of operations comprises:

receive information associated with a data object and the one or more cryptographic parameters, wherein the one or more cryptographic parameters are supported by the native computing application;

generate a private key and a public key in accordance with the one or more cryptographic parameters, wherein the private key and the public key are provisioned exclusively for the native computing application;

sign the data object using the private key generated by the client device;

transmit, to a server associated with the native computing application, the signed data object and the public key generated by the client device; and store the private key in a secure module of the client device;

perform a second sequence of operations to authenticate the client device and the user of the client device in accordance with the cryptographic authentication protocol that includes the one or more cryptographic parameters, wherein one or more operations of the second sequence are performed using the platform-agnostic framework; and access the native computing application via the client device based at least in part on performing the first sequence of operations and the second sequence of operations.

* * * * *